United States Patent
Schwarz et al.

(10) Patent No.: US 8,015,795 B2
(45) Date of Patent: *Sep. 13, 2011

(54) AIRCRAFT COMBINATION ENGINES PLURAL AIRFLOW CONVEYANCES SYSTEM

(75) Inventors: Frederick M. Schwarz, Glastonbury, CT (US); Brian M. Fentress, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 1374 days.

This patent is subject to a terminal disclaimer.

(21) Appl. No.: 11/804,429

(22) Filed: May 18, 2007

(65) Prior Publication Data

US 2010/0013242 A1   Jan. 21, 2010

(51) Int. Cl.
*F02K 3/00* (2006.01)
*F02K 7/00* (2006.01)
*F02K 9/00* (2006.01)
*F02K 99/00* (2006.01)

(52) U.S. Cl. ............... 60/224; 60/225; 60/782; 60/785
(58) Field of Classification Search ............... 60/224, 60/225, 782, 785
See application file for complete search history.

(56) References Cited

U.S. PATENT DOCUMENTS

| | | | |
|---|---|---|---|
| 7,690,188 B2 * | 4/2010 | Schwarz et al. | 60/224 |
| 7,690,189 B2 * | 4/2010 | Schwarz et al. | 60/224 |
| 7,743,613 B2 * | 6/2010 | Lee et al. | 60/782 |

\* cited by examiner

*Primary Examiner* — Michael Cuff
*Assistant Examiner* — Craig Kim
(74) *Attorney, Agent, or Firm* — Kinney & Lange, P.A.

(57) ABSTRACT

An engine combination for generating forces with a gas turbine engine generating force, and an internal combustion engine provided in the combination as an intermittent combustion engine generating force having an air intake, there being a plurality of air transfer ducts each extending from a different location in the gas turbine engine so as to be capable to provide air in each of those air transfer ducts at one end thereof at pressures differing from one another and connected at the other end of each to the air intake to transfer air thereto.

22 Claims, 1 Drawing Sheet

AIRCRAFT COMBINATION ENGINES PLURAL AIRFLOW CONVEYANCES SYSTEM

CROSS-REFERENCE TO RELATED APPLICATION

Referenced herein is U.S. application Ser. No. 11/713,262 filed Mar. 2, 2007 for "COMBINATION ENGINES FOR AIRCRAFT" by Frederick M. Schwarz, Brian M. Fentress, Andrew P. Berryann, Charles E. Lents and Jorn A. Glahn.

BACKGROUND OF THE INVENTION

The present invention relates to gas turbine engines for aircraft and, more particularly, to gas turbine engines each coupled to a corresponding auxiliary engine.

Gas turbine engines as continuous combustion, open Brayton cycle internal combustion engines have come to dominate as the power plants for larger, faster aircraft to essentially the exclusion of reciprocating engines, or internal, intermittent combustion engines, earlier used as power plants for these kinds of aircraft. This is largely because of the greater power-to-weight ratio of gas turbine engines versus internal combustion engines, especially in large horsepower engines, or, more appropriately, large thrust engines in which those large thrusts are provided with a relatively small, and so smaller drag, frontal area engine structures relative to reciprocating engines. Gas turbine engines generate such large thrusts for propulsion, or horsepower for engines with an output shaft, by combining large volumes of air with large amounts of fuel, and thereby form a jet of large velocity leading to the capability to provide desired speedy flights.

In addition to providing thrust, such gas turbine engines have operated integrated drive generators to generate electricity for the aircraft and for the engine electronic controls. The amount of electricity needed for these purposes in the past has tended to be relatively modest typically in the range of a few hundred kilowatts of electrical power but, with recently arriving new aircraft, exceeding a megawatt of power. However, there are some aircraft, usually for military uses, that have come to have needs for much larger amounts of electrical power either on a relative basis, the electrical power needed relative to the capability of the gas turbine engine available, or on an absolute basis with power needs significantly exceeding a megawatt. Furthermore, such demands for electrical power in military aircraft often occur at relatively high altitudes and often occur unevenly over relatively long time durations of use, that is, large peaks repeatedly occur in electrical power demand in the course of those long use durations.

Corresponding attempts to obtain the added power from the typical aircraft propulsive system, the gas turbine engine, that are needed to operate the concomitant much larger capacity electrical generators, either on a relative or absolute basis, will subtract significantly from the thrust output of the available turbine or turbines. Making up that thrust loss in these circumstances by operating such available turbine engines so as to increase the thrust output thereof causes the already relatively low fuel use efficiency during flight to decrease significantly, which can severely limit the length of otherwise long duration uses, and also brings those engines closer to becoming operationally unstable.

One alternative to using the gas turbine engine as the sole source of power to operate an electrical power generator is to add in the aircraft a further intermittent combustion internal combustion engine, such as gasoline engines operating on the any of the Diesel, Miller, Otto or Wankel cycles. Such engines can operate with a fuel efficiency on the order of seventy percent (70%) better than that of a continuous combustion (Brayton cycle) internal combustion gas turbine engine. At high altitudes, internal combustion engines of all kinds face the possibility of limited power output because of the relatively small air pressures there limiting the chemical reactions of oxygen with hydrogen and oxygen with carbon in the burning of the engine fuel in the engine combustion chamber or chambers. This can be solved for gas turbine engines by providing therein very large air flows through use, typically, of axial flow compressors usually in two stages with both a low compression compressor followed along the fluid flow path through the engine by a high compression compressor. This arrangement provides at least enough compressed air to the subsequent combustor to sustain the desired combustion process therein and a mass of airflow sufficient to combine with enough fuel to provide the energy needed to overcome the aircraft drag at the speed and altitude intended for operation.

However, such compressors can provide considerably more compressed air than the minimum needed for this purpose thereby allowing some of this compressed air to be delivered through an air transport duct to the air intake of an intermittent combustion internal combustion engine so that, in effect, the compressors of the gas turbine engine serve as a very capable supercharger for that intermittent combustion engine. Thus, this intermittent combustion engine can be operated at the same relatively high altitudes at which the gas turbine engine propelling the aircraft operates while this turbine engine is also supplying compressed air to that intermittent combustion engine. There, depending on the values selected for the peak air intake pressure and engine compression ratio, the intermittent combustion engine can be used as a power source for an electrical power generator that can generate much greater amounts of electrical power than can one powered by a gas turbine engine.

In such aircraft so equipped with a gas turbine engine used as a supercharger for an accompanying intermittent combustion engine while also propelling the aircraft, the amount of electrical power needed at any time during flights thereof substantially determines the amount of torque needed to be supplied by the intermittent combustion engine to the electrical power generator. The amount of torque generated is determined by the amount of fuel supplied to the combustion chambers of the intermittent combustion engine, and there is a corresponding amount of air that must also be supplied to those chambers to support the desired combustion therein. At some altitudes and certain other flight conditions and for some amounts of electrical power concurrently demanded in the aircraft, the amount of compressed air supplied by the gas turbine engine through an air transport duct to the air intake of the intermittent combustion engine is more or less optimal. In other circumstances, difficulties arise because of aircraft operations being required at different altitudes with the attendant different air pressures, because of different gross weights due to different flight missions and the consumption of fuel during flights with the attendant differing operating powers that must be provided by the gas turbine engine, and the like.

These differing circumstances change the pressure of the compressed air being delivered by the gas turbine engine air compressor to the intermittent combustion engine, and so could exceed its pressurized air containment capability or change its torque generating capability and, correspondingly, the amount of electrical power generated. In these other circumstances, the intermittent combustion engine might be overpressured at its air intake because the compression ratio of the engine could increase the pressure of the already compressed air supplied thereto to the point of some containment component bursting. Alternatively, the intermittent combustion engine might be insufficiently pressured there to result in incomplete combustion in the combustion chambers thereof and so a reduced output torque. Thus, there is a desire to better match the air pressure at the air intake of the intermittent combustion engine to varying flight and electrical power demand conditions.

BRIEF SUMMARY OF THE INVENTION

The present invention provides an engine combination for generating forces with a gas turbine engine having an air inlet open to the atmosphere, an air compressor, a combustor, a turbine and an exhaust exit nozzle open to the atmosphere positioned along a fluids flow path passing through all for generating force with the gas turbine engine having a plurality of air transfer ducts each extending from a different location therein so as to be capable to provide air in each of those air transfer ducts at one end thereof at pressures differing from one another. In addition, an internal combustion engine is provided in the combination as an intermittent combustion engine having an air intake coupled to combustion chambers therein and a rotatable output shaft for generating force also coupled to those combustion chambers, the plurality of air transfer ducts each being connected at an opposite end thereof to the air intake to be capable of being selected to transfer air thereto. A plurality of control valves can be provided each at least provided partially in a corresponding one of the plurality of air transfer ducts at least some of which control valves can be selectively directed to open more or close more to thereby selectively affect the passage of air through that air duct. A primary electrical generator having an output conductor can have a rotatable input shaft connected to the intermittent combustion engine output shaft with the output conductor being electrically energized in response to rotation of the input shaft.

DETAILED DESCRIPTION

Figure 1:
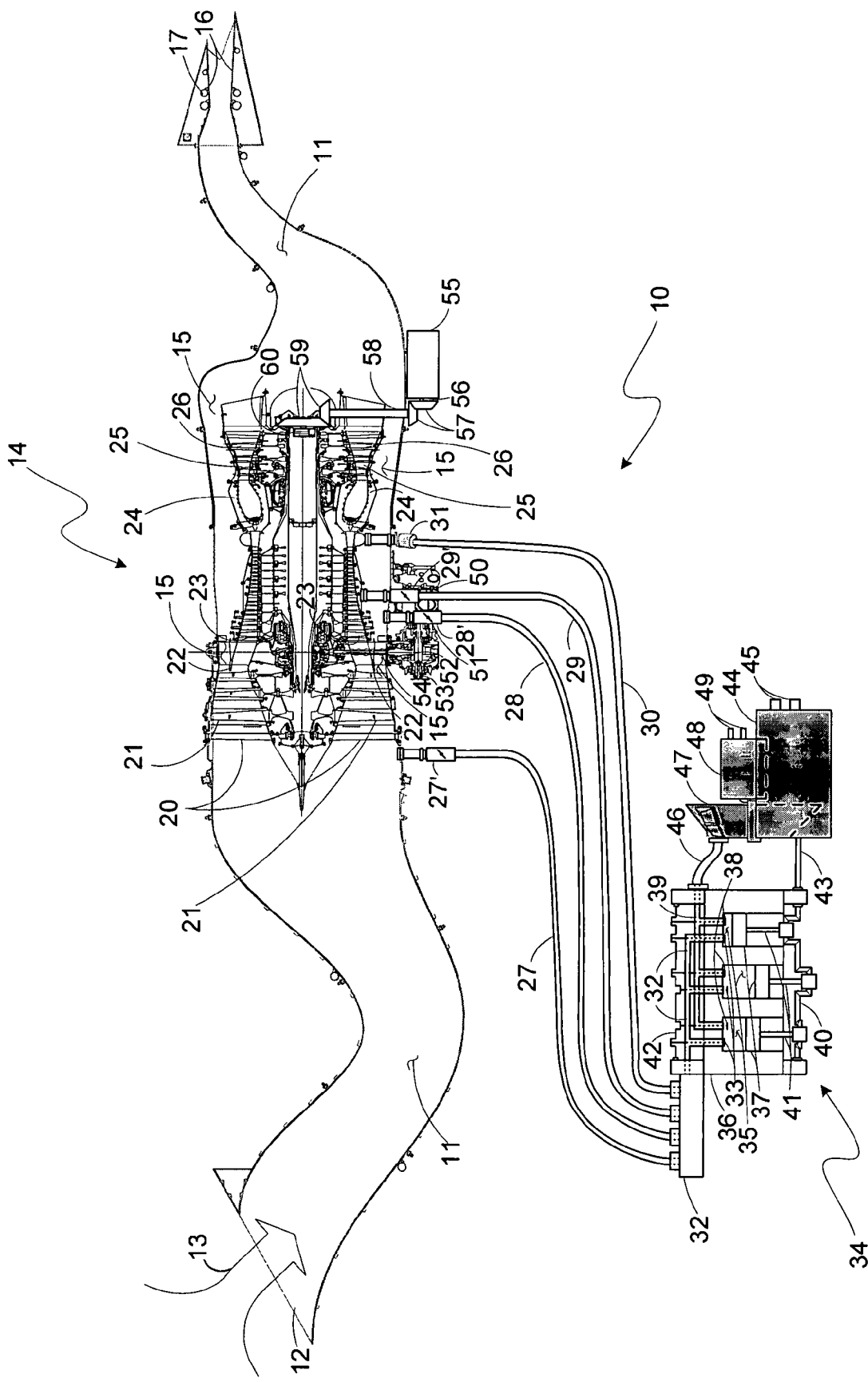
FIG. 1 is a schematic representation of a cross section side view of a portion of an aircraft embodying the present invention.

A larger range of optimum, or near optimum, of pressures of the air supplied to the air intake of the intermittent combustion engine, during its operation over a variety of aircraft flight conditions and aircraft electrical power electrical power demands, can be provided by conveying air to that intake from different locations in the gas turbine engine at each of which the local air pressure differs from that of the others. As an example, a turbofan engine provides airstreams therethrough with differing air pressures at different locations along the stream as well as different airstreams each at air pressures differing from that of the other or others, and these differences occur over a large range of pressures from atmospheric at the engine air inlet to many times that pressure at the output location of the high compression air compressor.

The availability of these alternative airstreams, along with some range of pressure regulation of the air drawn therefrom, allows choosing the most suited of them for use in operating the intermittent combustion engine with any particular combination that develops of flight conditions and electrical power demands. Such selections of air supplies to the air intakes of the intermittent combustion engine at alternative pressures thereby avoids severe under or over pressures with respect to the optimum for operating that engine, and so allows operating the aircraft at many different combinations of altitude, speed and gross weight with varying electrical power demands for each such combination.

FIG. 1 shows a schematic representation of a cross section side view of a portion of an aircraft with an example of such a gas turbine engine and intermittent combustion engine combination, 10, in an arrangement in which most of the aircraft structure in which they are positioned has been omitted from this view. However, there is at least a portion of an engine duct, 11, in that aircraft that is shown and has an air inlet, 12, facing forward in the aircraft. The configuration shown for duct 11, with its somewhat sinuous shape, is from a stealth type military aircraft, several kinds of which are unmanned aircraft. This duct first curves downward, coming from the front of the aircraft at the duct opening provided by air inlet 12 to the atmosphere from which an airstream, 13, is drawn. The duct then curves upward to open to a gas turbine engine provided as a turbofan engine, 14, in engine duct 11 which uses airstream 13 for combustion and for fan forced air propulsion purposes. This passageway curvature of duct 11 past air inlet 12 serves to hide the front of engine 14 from impinging electromagnetic radiation at various wavelengths. Outer portions, 15, of duct 11 adjacent engine 14 past a splitter as a fan duct convey the fan forced air provided by engine 14 for propulsion purposes into the remainder of duct 11 past engine 14 toward the outlet of duct 11 to the atmosphere as will be described below.

This fan forced air and the combustion products resulting from combustion in engine 14 are forced out of the remainder of engine duct 11 to an exit nozzle, 16, serving as the outlet of duct 11. A fluid actuation system, 17, provides the force to partial open and close nozzle 16 during the operation of turbofan engine 14. Again, duct 11 past engine 14 first curves downward, coming from that engine, and then the duct curves upward to open to nozzle 16. Here, too, this passageway curvature of duct 11 past engine 14 serves to hide the rear of engine 14 from electromagnetic radiation at various wavelengths impinging at the rear of the aircraft.

Engine 14 has an air inlet guide vane, 20, followed by a high pressure fan, 21, as the fan for the turbofan engine to force air outside and past a splitter, 22, and then through duct portions 15 into the rear of duct 11 and out of that duct through nozzle 16 to exit to the atmosphere. In addition, high pressure fan 21 also serves as a low pressure air compressor through delivering compressed air inside splitter 22 to a high pressure air compressor, 23. The compressed air from high pressure compressor 23 arrives at a combustor, 24, to which fuel is also delivered and burned. The combustion products form a jet of fluid which impinges first on a high pressure turbine, 25, and then on a low pressure turbine, 26, to cause them to rotate which, through appropriate mechanical linkings, leads to high pressure compressor 23 and high pressure fan 21 being forced thereby to also rotate. The combustion products then reach the remainder of duct 11 past engine 14 to exit through nozzle 16 to the atmosphere.

An atmospheric air conveyance duct, 27, is connected at one end thereof through the inlet portion of duct 11 just ahead of air inlet guide vane 20 of turbofan engine 14 to receive air from that location compressed to the pressure resulting just from the velocity of the aircraft in flight through an atmospheric air flow control valve, 27', typically controlled by a system computer or controller (not shown but typically an engine control computer or an aircraft systems computer either eliminating the need for such an engine control computer or operating with it in a distributed control system). This valve is used to control the flow of atmospheric air from the turbofan engine inlet through duct 27 so as to be capable of varying the pressure thereof to some extent. The opposite end of duct 27 is connected to a corresponding entrance of an air intake, or intake manifold, 32, leading to engine air intake valves, 33, for an intermittent combustion engine, 34, represented in the example of FIG. 1 as a Diesel or Otto cycle engine. Control valve 27' can be closed off to prevent air under pressure in intake manifold 32 from being forced to flow in the opposite direction through duct 27 to the atmosphere. Intermittent combustion engine 34 is shown positioned forward in the aircraft of turbofan engine 14 to shift the center of mass of the aircraft forward to counter some of the weight of engine 14 but other positions are possible to be used if desired.

Similarly, another compressed air conveyance duct, 28, is connected at one end thereof into turbofan engine 14 to receive, rearward of splitter 22, compressed air from high pressure fan 21, as the fan for the turbofan engine that forces engine inlet air outside and past splitter 22, which fan air is received through a compressed air flow control valve, 28', again typically controlled by a system computer (not shown). Here, too, this valve is used to control the flow of inlet air compressed by engine fan 21 taken from outer portions 15 of duct 11 through duct 28 so as to be capable of varying the pressure thereof to some extent. The opposite end of duct 28 is connected to a corresponding entrance of air intake manifold 32. Control valve 28' can also be closed off to prevent air under pressure in intake manifold 32 from being forced to flow in the opposite direction therethrough.

A further compressed air conveyance duct, 29, is connected at one end thereof into turbofan engine 14 through the case about high pressure compressor 23 to receive, further rearward of splitter 22 but back from the output of compressor 23, compressed air from high pressure compressor 23 at an intermediate pressure less than that occurring at the output of that compressor but greater than that provided by fan 21, which intermediate pressure air is received through a compressed air flow control valve, 29', also typically controlled by a system computer (not shown). Again, this valve is used to control the flow of inlet air compressed to an intermediate pressure by engine compressor 23 taken from case thereabout through duct 29 so as to be capable of varying the pressure thereof to some extent. The opposite end of duct 29 is connected to a corresponding entrance of air intake manifold 32. Control valve 29' can again be closed off to prevent air under pressure in intake manifold 32 from being forced to flow in the opposite direction therethrough.

A final and greatest capacity compressed air conveyance duct, 30, is connected at one end thereof into turbofan engine 14 to receive compressed air from the output of high pressure compressor 23 through a compressed air flow control valve, 31, once again typically controlled by a system computer (not shown), and used to control the flow of compressed air from high pressure compressor 23 through duct 30. The opposite end of duct 30 is connected to a corresponding entrance of air intake manifold 32.

The system computer is connected to various sensors to determine the flight conditions occurring as well as the electrical power demands occurring, and controls the amount of fuel supplied to intermittent combustion engine 34 to determine the torque provided thereby to electrical power generators to meet those power demands. This information available to the system computer allows it choose which of air conveyance ducts 27, 28, 29 and 30, and the degree of opening of the corresponding one of air flow control valves 27', 28', 29' and 31, to provide the optimal or near optimal amount of air to intake 32 to operate engine 34 in supplying the electrical power being demanded.

Valves 33 in engine 34 control the air taken into combustion chambers, 35, bounded by an engine block, 36, providing the basic structure of engine 34 and by pistons, 37. Each chamber also has an exhaust valve, 38, through which combustion products are exhausted to an exhaust manifold, 39. A rotatable crankshaft, 40, has a connecting rod, 41, rotatably coupling it to a corresponding one of each of pistons 37. A rotatable camshaft, 42, is used to open and close air intake valves 33 and exhaust valves 38 in a suitable sequence.

Crankshaft 40, under the control of a system controller not shown, is rotated by the force on pistons 37 transmitted thereto by corresponding ones of connecting rods 41 due to repeated combustion events in the corresponding combustion chamber 35 which events occur in all of chambers 35 in a suitable sequence before repeating. These events correspondingly use the air quantities taken through valves 33 repeatedly into, and the fuel quantities repeatedly injected into, those chambers for combustion. The fuel quantities are injected by a fuel injection system not seeable in this FIGURE and, as indicated above, the magnitudes thereof are used to select the mechanical power output of crankshaft 40 of the intermittent combustion engine. The resulting combustion products are correspondingly repeatedly rejected from those chambers through valves 38. If an Otto cycle engine is used as intermittent combustion engine 34, the combustion events are initiated by the repeated sparkings of spark plugs not shown in this FIGURE in a suitable sequence across combustion chambers 35 under the control of the system controller. In addition, intermittent combustion engine 34 has a cooling system not shown for cooling the engine structure about combustion chambers 35.

The rotation of crankshaft 40 is suitably fastened to an input shaft, 43, of a primary electrical power generator, 44. The resulting rotation of input shaft 43 electrically energizes output electrical terminals, 45, of generator 44 to thereby generate the desired electrical power thereat for operating aircraft devices (not or not all shown). The demand for electrical power in the aircraft is used as a basis to select the fuel quantities injected in the combustion chambers of the intermittent combustion engine to have that engine supply sufficient mechanical power crankshaft 40 to sufficiently rotate input shaft 43 of generator 44 to meet that demand.

An exhaust duct, 46, extends from exhaust manifold 39 of intermittent combustion engine 34 to an exhaust turbine, 47, to result in the combustion products of engine 34 impinging on the blades of that turbine to thereby cause it to rotate. A central shaft of this exhaust turbine is coupled to an input shaft of a secondary electrical power generator, 48. The resulting rotation of this input shaft electrically energizes output electrical terminals, 49, of generator 48 to thereby generate the further desired electrical power thereat.

Another supplemental electrical power generator is provided in this example by operating an electrical starter (generator), 50, with the electrical motor therein operated also as an electrical generator after the completion of the starting process. Starter (generator) 50 rotates high pressure air compressor 23 to start turbofan engine 14 and, thereafter, with engine 14 operating, this compressor can selectively rotate the rotor in starter (generator) 50 to cause the starter motor to be operated as an electrical power generator.

Starter (generator) 50 has a drive (input) shaft, 51, extending from the rotor therein to a set of bevel gears, 52, with the bevel gear on the opposite side of this set rotatably coupled to a clutch, 53. Clutch 53 allows the system computer to engage and disengage starter (generator) 50 as appropriate. The opposite side of clutch 53 has a engagement shaft, 54, extending therefrom ending in bevel gear rotatably engaged with a counterpart bevel gear in a portion of high pressure air compressor 23.

A further supplemental electrical power generator, 55, is shown in FIG. 2 for this example which has an input shaft, 56, extending from the rotor therein to a set of bevel gears, 57, with the bevel gear on the opposite side of this set rotatably coupled to a shaft, 58, which in turn is coupled to a further set of bevel gears, 59. These bevel gears are coupled to an output shaft of low pressure turbine 26 through a clutch, 60. Clutch 60, here too, allows the system computer to engage and disengage generator 55 as appropriate.

Although the present invention has been described with reference to preferred embodiments, workers skilled in the art will recognize that changes may be made in form and detail without departing from the spirit and scope of the invention.

The invention claimed is:

1. An engine combination for generating forces, the engine combination comprising:
    a gas turbine engine having an air inlet open to the atmosphere, an air compressor, a combustor, a turbine and an exhaust exit nozzle open to the atmosphere all positioned along a fluids flow path passing therethrough for generating force, the gas turbine engine having a plurality of air transfer ducts each extending from a different location therein so as to be capable to provide air in each of those air transfer ducts at one end thereof at pressures differing from one another; and
    an internal combustion engine provided as an intermittent combustion engine having an air intake coupled to combustion chambers therein and a rotatable output shaft also coupled to those combustion chambers for generating force, the plurality of air transfer ducts each being connected at an opposite end thereof to the air intake to be capable of being selected to transfer air thereto.

2. The combination of claim 1 further comprising a plurality of control valves each at least provided partially in a corresponding one of the plurality of air transfer ducts at least some of which control valves can be selectively directed to open more or close more to thereby selectively affect the passage of air through that air duct.

3. The combination of claim 1 wherein at some of the a plurality of control valves can be closed to prevent passages of air through the air transfer duct in which it is provided.

4. The combination of claim 1 further comprising a primary electrical generator having a rotatable input shaft mechanically coupled through a coupler to the intermittent combustion engine output shaft and having an output conductor, the output conductor being electrically energized in response to rotation of the input shaft.

5. The combination of claim 1 wherein the intermittent combustion engine has an exhaust outlet coupled to the combustion chambers therein and further comprises an intermittent combustion engine exhaust turbine positioned at the exhaust outlet and a secondary electrical generator having a rotatable input shaft mechanically coupled through a coupler to an intermittent combustion engine exhaust turbine output shaft, the secondary electrical generator having an output conductor which is electrically energized in response to rotation of the input shaft thereof.

6. The combination of claim 1 further comprising a supplemental electrical generator having a rotatable input shaft coupled through a coupler to the turbine of the gas turbine engine, the supplemental electrical generator having an output conductor which is electrically energized in response to rotation of the input shaft thereof.

7. The combination of claim 6 further comprising a clutch as part of the coupler which can be selectively directed to engage or disengage to thereby selectively complete the coupling to cause the supplemental electrical generator input shaft to be rotated.

8. The combination of claim 1 further comprising an electrical starter having a rotatable operation shaft coupled through a coupler to the air compressor of the gas turbine engine such that the starter can be selectively directed to rotate a rotor in the air compressor or to have a rotor in the starter to be rotated by the air compressor to generate electrical power.

9. The combination of claim 8 further comprising a clutch as part of the coupler which can be selectively directed to engage or disengage to thereby selectively complete the coupling to allow the starter to be selectively directed to rotate a rotor in the air compressor or to allow a rotor in the starter to be rotated by the air compressor.

10. The combination of claim 1 wherein one of the plurality of air transfer ducts extends from the gas turbine engine so as to receive compressed air at an output pressure from an output location of the air compressor, and another one of the plurality of air transfer ducts extends from the gas turbine engine so as to receive compressed air at an intermediate pressure less than the output pressure from an intermediate location of the air compressor between an input location and the output location of the air compressor.

11. The combination of claim 1 wherein the engine combination is in an aircraft propelled by the gas turbine engine that is a turbofan engine having an engine fan located between the air inlet and the air compressor to force air both into the sir compressor and a fan duct outside of the air compressor, and wherein one of the plurality of air transfer ducts extends from the gas turbine engine so as to receive compressed air at an output pressure from an output location of the air compressor, and another one of the plurality of air transfer ducts extends from the gas turbine engine so as to receive compressed air at a fan duct pressure less than the output pressure from a fan duct location outside of the air compressor.

12. The combination of claim 1 wherein one of the plurality of air transfer ducts extends from the gas turbine engine so as to receive compressed air at an output pressure from an output location of the air compressor, and another one of the plurality of air transfer ducts extends from the air inlet of the gas turbine engine so as to receive air at an inlet pressure less than the output pressure from an air inlet location of the gas turbine engine.

13. The combination of claim 1 wherein the intermittent combustion engine is positioned at least in part forward of the gas turbine engine in an aircraft propelled by the gas turbine engine.

14. The combination of claim 1 wherein the engine combination is in an aircraft propelled by the gas turbine engine that is a turbofan engine.

15. A method of generating force and electrical power using an engine combination of a gas turbine engine having an air inlet open to the atmosphere, an air compressor, a combustor, a turbine and an exhaust exit nozzle open to the atmosphere all positioned along a fluids flow path passing therethrough and of an internal combustion engine provided as an intermittent combustion engine having an air intake coupled to combustion chambers therein, a fuel system coupled to those combustion chambers and a rotatable output shaft also coupled to those combustion chambers, there being a plurality of air transfer ducts each extending from a different location in the gas turbine engine so as to be capable to provide air in each of those air transfer ducts at one end thereof at pressures differing from one another to the air intake, the method comprising:

operating the gas turbine engine to establish a combustion products flow out the exhaust exit nozzle;

selecting an air transfer duct for distributing air from its location in the gas turbine engine, and distributing air through the selected air transfer duct to the air intake of the intermittent combustion engine.

16. The method of claim 15 further comprising a plurality of control valves each between the location of a corresponding one of the air transfer ducts in the gas turbine engine and the air intake which can be selectively directed to open more or close more to thereby selectively affect the passage of air through that air duct.

17. The method of claim 15 further comprising an electrical power generator having an input shaft coupled to the output shaft of the intermittent combustion engine with the electrical power generator having output conductors which are electrically energized by rotating the input shaft, and selecting quantities of fuel to be injected into the combustion chambers of the intermittent combustion engine based at least in part on the demand for electrical power at the output conductors of the electrical power generator.

18. A power generation system for propelling, and generating electrical power in, an aircraft, the system comprising:

a turbofan engine in an engine compartment in the aircraft with an air inlet in the aircraft open to the atmosphere and leading to an air compressor in the turbofan engine followed by a combustor, the gas turbine engine having a plurality of air transfer ducts each extending from a different location therein so as to be capable to provide air in each of those air transfer ducts at one end thereof at pressures differing from one another;

an internal combustion engine provided as an intermittent combustion engine in the aircraft having an air intake coupled to combustion chambers therein, a rotatable output shaft also coupled to those combustion chambers for generating force, and a fuel system for providing fuel to those combustion chambers, the plurality of air transfer ducts each being connected to the air intake to transfer air thereto, and a primary electrical generator in the aircraft having a rotatable input shaft mechanically coupled through a coupler to the intermittent combustion engine output shaft and having an output conductor with the output conductor being electrically energized in response to rotation of the input shaft.

19. The combination of claim 18 further comprising a plurality of control valves each between the location of a corresponding one of the air transfer ducts in the turbofan engine and the air intake which can be selectively directed to open more or close more to thereby selectively affect the passage of air through that air duct.

20. The combination of claim 18 wherein the aircraft is an unmanned stealth type aircraft.

21. The combination of claim 18 wherein the intermittent combustion engine is positioned at least in part forward of the turbofan engine in an aircraft propelled by the turbofan engine.

22. The combination of claim 18 further comprising the aircraft having selectively operated electrical power consumption devices therein electrically connected or connectable to the output conductor of the primary electrical generator to receive electrical power therefrom.

* * * * *